United States Patent [19]

Laue

[11] 4,371,358

[45] Feb. 1, 1983

[54] UNIVERSAL JOINT AND METHOD OF MAKING

[75] Inventor: Charles E. Laue, Wilmette, Ill.

[73] Assignee: Hamilton-Pax, Inc., Chicago, Ill.

[21] Appl. No.: 159,211

[22] Filed: Jun. 13, 1980

[51] Int. Cl.³ .............................................. F16D 3/26
[52] U.S. Cl. ..................................... 464/136; 29/525; 403/58; 403/347
[58] Field of Search ................ 64/17 R, 17 A, 17 SP; 29/434, 525, 437, 526, 438; 403/346, 347

[56] References Cited

U.S. PATENT DOCUMENTS

| 420,284 | 1/1890 | Schoff | 64/17 R |
| 1,143,659 | 6/1915 | Stern | 64/17 R |
| 1,143,660 | 6/1915 | Stern | 64/17 R |
| 2,813,409 | 11/1957 | Wolcott | 64/17 R |
| 3,103,798 | 9/1963 | Piatti | 64/17 R |
| 3,434,196 | 3/1969 | Lavengood | 64/17 R X |

FOREIGN PATENT DOCUMENTS

1231499 5/1971 United Kingdom .............. 64/17 R

*Primary Examiner*—Tony M. Argenbright
*Attorney, Agent, or Firm*—Walter L. Schlegel, Jr.

[57] ABSTRACT

A novel universal joint is made by forming a pair of elongated members, finishing the ends of said members to form bearing surfaces which are hard and smooth, and rigidly interconnecting the members between their ends to form a substantially cruciform spider structure which is subsequently assembled with the bearing surfaces of one member pivotally connected to the jaws of one clevis and with the bearing surfaces of the other member similarly connected to the jaws of another clevis, thereby completing a universal joint.

6 Claims, 22 Drawing Figures

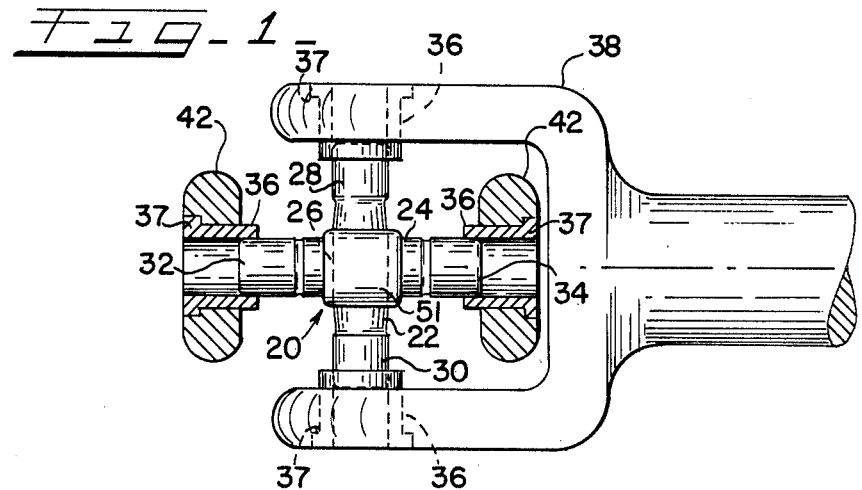
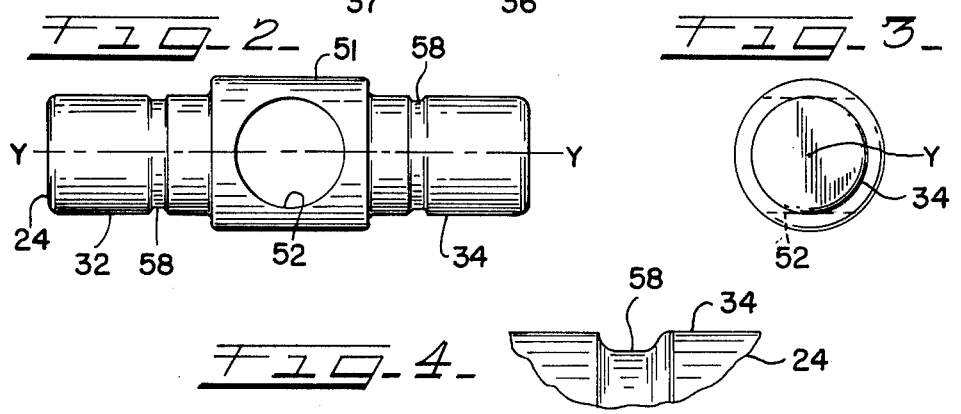
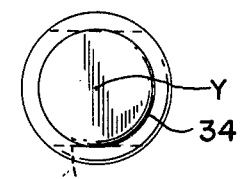
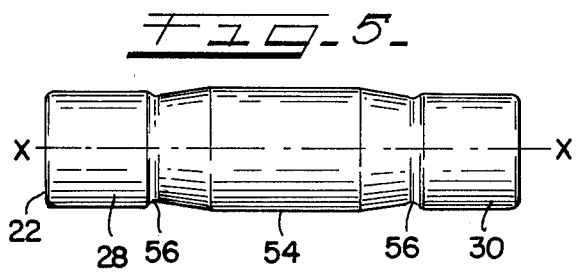
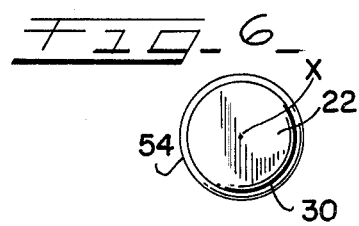
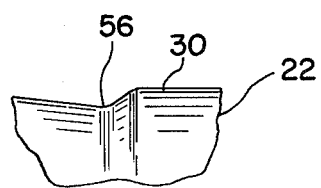

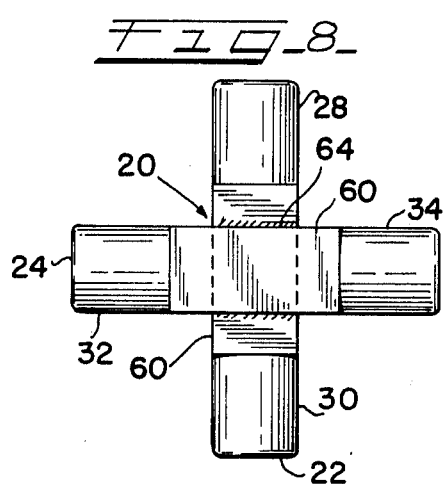
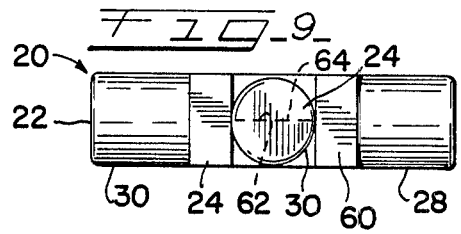
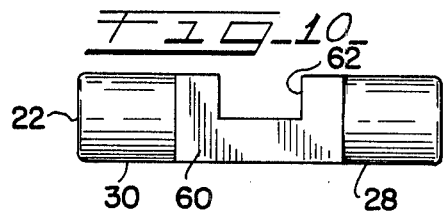
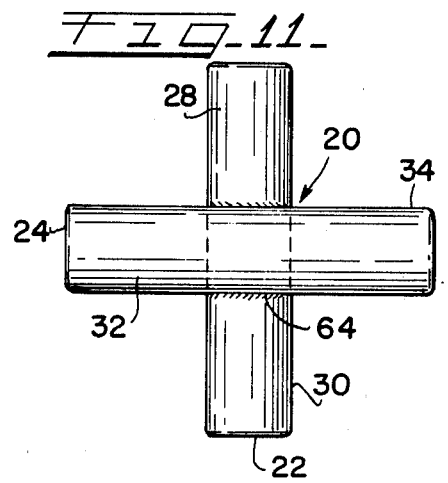
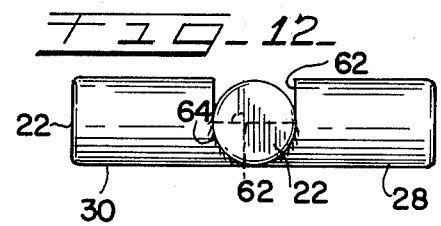
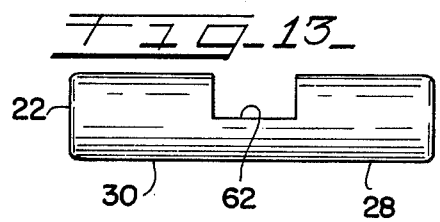
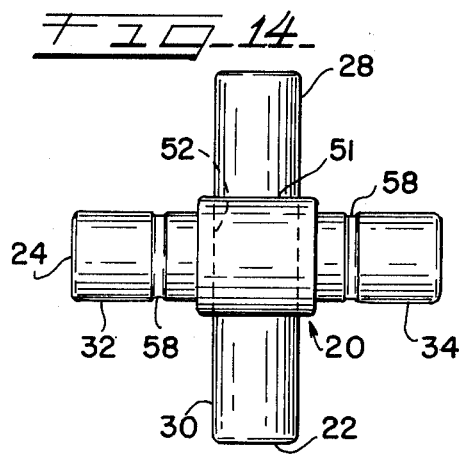
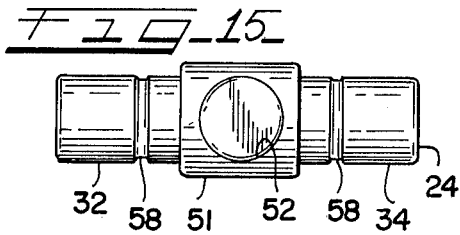
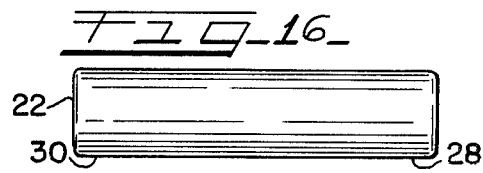

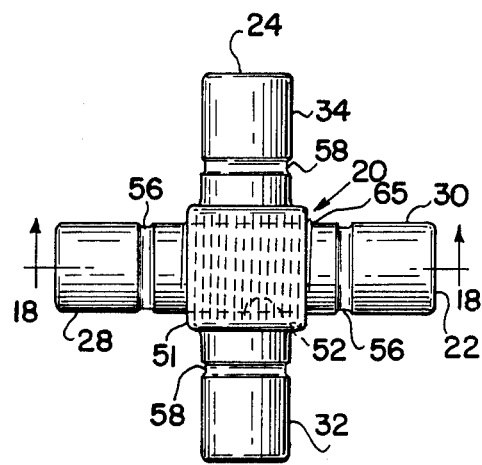
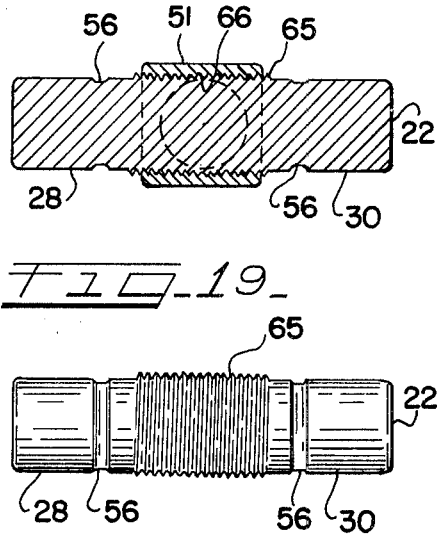
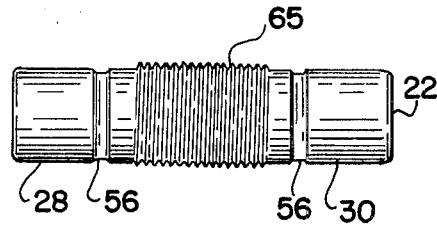
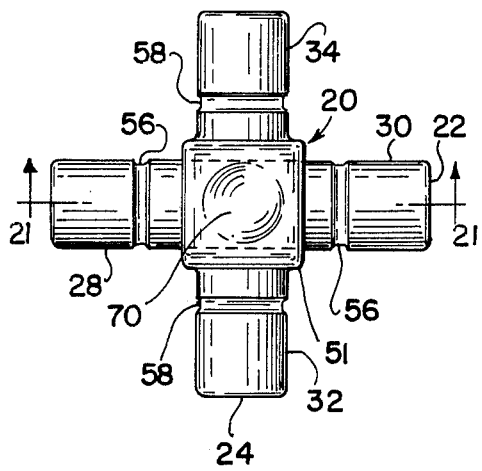
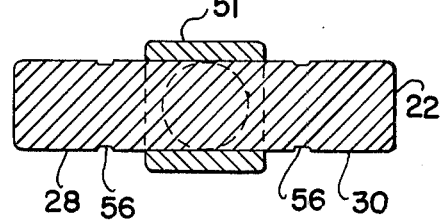
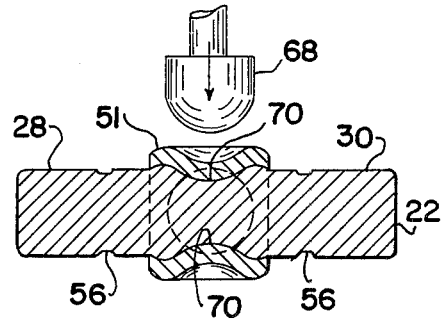

UNIVERSAL JOINT AND METHOD OF MAKING

This invention relates to universal joints as commonly used, for example, in steering mechanisms and power drive shaft connections and other industrial applications.

According to prior art practice, such a joint has been made by forging a one-piece cruciform or spider member, then heat treating and grinding the ends of the member to form cylindrical bearings, and then pivotally mounting one pair of coaxial spider bearings in needle bearings within complementary openings of a clevis and mounting the other pair of coaxial spider bearings in needle bearings within complementary openings of another clevis to complete the universal joint.

A major disadvantage of this prior art practice has been the expensive step of using a one-piece cruciform forging. According to the invention, it has been discovered that the cost of such a spider can be minimized by machining or cold heading a pair of elongated members from low carbon, soft steel bar stock, heat treating the ends of the members to case harden the ends, grinding the ends to form smooth, hard bearings, and rigidly interconnecting the members between their ends to complete the spider the bearings of which are subsequently pivoted to a pair of clevises to complete a universal joint.

Accordingly a primary object of the invention is to minimize the cost of such a universal joint without any sacrifice in strength or dependability in service.

Another object of the invention is to form coaxial bearings on the ends of each of a pair of elongated members and rigidly interconnect the members with the bearing axes coplanar and with the bearing axis of one member perpendicular to the bearing axis of the other member.

The foregoing and other objects of the invention will become apparent from a consideration of the following specification and the accompanying drawings, wherein:

FIG. 1 is a plan view of the novel spider assembled with a pair of clevises, one of which is shown in section through its needle bearings, defining with the spider a universal joint embodying a preferred form of the invention;

FIG. 2 is an enlarged side elevational view of the female member of the novel spider shown in FIG. 1;

FIG. 3 is an end elevational view taken from the right of FIG. 2;

FIG. 4 is a fragmentary further enlarged side elevational view of the female spider member showing the detail of one of a pair of identical annular grooves in its outer diameter;

FIG. 5 is an enlarged side elevational view of the male spider member shown in FIG. 1;

FIG. 6 is an end elevational view taken from the right as seen in FIG. 5;

FIG. 7 is a further enlarged fragmentary side elevational view of the male spider member of FIG. 5 showing the detail of one of a pair of identical annular grooves in its outer diameter.

FIGS. 8-10 show a modification of the spider of FIGS. 1-7, FIG. 8 being a plan view of the modified spider, FIG. 9 being a side elevational view thereof, and FIG. 10 being a side elevational view of one of the pair of identical members defining the modified spider;

FIGS. 11-13 show another modification of the novel spider, FIG. 11 being a plan view thereof, FIG. 12 being a side elevational view thereof and FIG. 13 being a side elevational view of one of a pair of identical members defining this modification of the novel spider;

FIGS 14-16 shows still another modification of the novel spider, FIG. 14 being a plan view thereof, FIG. 15 being a side elevational view of the female member of the spider, and FIG. 16 being a side elevational view of the male member of the spider;

FIGS. 17-19 show yet another modification of the novel spider, FIG. 17 being a plan view thereof, FIG. 18 being a sectional view on line 18—18 of FIG. 17, and FIG. 19 being a side elevational view of the male member of the spider; and FIGS. 20-22 show still another modification of the novel spider, FIG. 20 being a plan view thereof, FIG. 21 being a sectional view on line 21—21 of FIG. 20 and showing a punch in elevational view, and FIG. 22 being a sectional view comparable in FIG. 21 but prior to the punching step which produces the completed spider of FIGS. 20 and 21.

Describing the invention in detail and referring first to FIG. 1, a preferred embodiment of the invention comprises a novel cruciform structure 20, commonly known in the art as a spider, including a pair of elongated male and female members 22 and 24 rigidly interconnected intermediate their ends at 26 as hereinafter described.

The member 22 is preferably a carburized steel bar and comprises a pair of coaxial bearings 28 and 30 ground to smooth cylindrical form.

The female member 24 is also preferably a carburized steel bar and comprises a pair of coaxial bearings 32 and 34 also ground to smooth cylindrical form.

When the spider 20 is assembled as shown in FIG. 1, the longitudinal axes x-x (FIG. 5) and y-y (FIG. 2) of the members 22 and 24, respectively, and of the bearings 28, 30, 32 and 34 are coplanar, and the longitudinal or bearing axis x-x of male member 22 is substantially perpendicular to the longitudinal or bearing axis y-y of the female member 24.

The bearings 28 and 30 are mounted by conventional needle bearings 36 (FIG. 1) in complementary openings of a clevis 38 and the bearings 32 and 34 are similarly mounted in such needle bearings in complementary openings of a clevis 42 which is preferably substantially identical in form to the clevis 38.

Referring again to FIGS. 2-4, it will be seen that female member 24 has a central cylindrical opening 52 the axis of which is normal to longitudinal axis y-y of member 24 from which the bearings 32 and 34 are struck.

The male member 22, as shown in detail in FIG. 5, has a central cylindrical bearing 54 coaxial with the bearings 28 and 30 which are also coaxial with longitudinal axis x-x of the member 22. The bearing 54 is also preferably ground to smooth cylindrical form to afford a tight fit in opening 52 into which the bearing 54 is forced by pressure of a value required to retain members 22 and 24 in a rigid cruciform spider structure or assembly 20 shown in the assembly view of FIG. 1.

The male member 22 may have a pair of grooves 56 coaxial with axis x-x and formed and arranged to define the axially inner ends of bearings 28 and 30.

Similarly the female member may have a pair of grooves 58 coaxial with axis y-y and formed and arranged to define the axially inner ends of bearing 32 and 34.

In fabricating the novel spider 20, the male and female members are preferably formed as by machining or cold heading from low carbon, mild steel bar stock which has not been heat treated. These members are heated to above their critical temperature in a carburizing atmosphere, for example, by induction heating or by burning gas to develop both the heat and the carburizing atmosphere. The members are then quenched to case harden them and their ends, as well as the bearings 28, 30, 32, 34 and 54 are then ground to finished form. The hole 52 is drilled through the female member 24 before carburizing. The bearing 54 of male member 22 after grinding is press-fitted into the hole 52 by pressure as required to hold members 22 and 24 together to define the spider structure 20, preparatory to its assembly with clevises 38 and 42.

The commonly used methods of case hardening are carburizing, nitriding and cyaniding. Carburizing may be done by pack carburizing, gas carburizing or liquid carburizing, the latter involving the use of calcium cyanide. In the present invention, gas carburizing is preferred for reasons of speed and economy and a better gradation of the case.

In gas processing natural gas or propane may be introduced into a heated chamber in which the members 22 and 24 are continuously tumbled at a temperature above the critical temperature of the case as, for example, by rotating the chamber. A direct quench from the chamber is preferred, although, if desired, a double heat treatment may be employed to obtain optimum properties of both the case and the core. For example, the member 22 or 24, after cooling from the chamber temperature, may be reheated to above the critical temperature corresponding to the low carbon core and suitably cooled to refine its structure. The member may then be reheated to just above the critical temperature of the case and then quenched. Or, if desired, a single reheating from the chamber temperature and quench from above the critical temperature of the case may be employed.

If desired the larger-diameter central portion 51 of the female member through which the opening 52 is drilled may be protected from carburization, as, for example, by plating the central portion with a coating of copper before heating in the chamber. This causes the central portion 51 to remain ductile, thereby avoiding any possibility of cracking as the male member bearing 54 is press-fitted into the hole 52 which may be formed either before or after the copper plating is applied and either before or after the female member 24 is heat treated for carburization, as heretofore described.

If desired, the central portion 51 of the female member may be protected from hardening by heating only the bearings 32 and 34 axially outwardly of the grooves 58 as, for example, by induction heating.

Also, if desired, the bar stock from which the members 22 and 24 are formed may contain enough carbon so that case hardening may be achieved by merely heating the members to a temperature above their critical temperature and then quenching them. In such a process the heating need not be in a carburizing atmosphere.

After the members 22 and 24 have been assembled, they may be brazed together in the hole 52, in which case heat treating and grinding follow brazing.

FIGS. 8 to 10 show a modification of the novel spider 20 wherein parts corresponding to those of FIGS. 1–7 are identified by corresponding numerals. In this modification the members 22 and 24 are not formed as male and female members but instead are substantially identical in form with each having a flat central portion 60 notched as at 62 so that the notches can be mated as shown in FIGS. 8 and 9 and the members 22 and 24 may be brazed together at 64 within notches 62 in the position of FIGS. 8 and 9.

In this modification, the members 22 and 24 are formed of mild steel and are brazed as at 64 to complete the spider 20 prior to heat treating and grinding and subsequent assembly with the clevises 38 and 42.

FIGS. 11–13 show another modification of the novel spider 20 which is similar to that of FIGS. 8–10 except that the members 22 and 24, which are substantially identical, are round in cross-section and heat treated and ground smooth from end to end thereof except for the notches 62, and parts of FIGS. 11–13 corresponding to those of FIGS. 8–10 are identified by corresponding numerals. Also the modification of FIGS. 11–13 is produced by the same method as that of FIGS. 8–10.

FIGS. 14–16 show still another modification of the novel spider 20 which is identical to that of FIGS. 1–7 except that the male member 22 is of uniform round cross-section, heat treated and ground smooth from end to end thereof. All other parts of this modification are identical to those of FIGS. 1–7 and are identified by corresponding numerals. Also the spider of the modification of FIGS. 14–16 may be produced as described in connection with FIGS. 1–7.

FIGS. 17–19 disclose yet another modification of the invention wherein parts corresponding to those of FIGS. 1–7 are identified by corresponding numerals. The spider 20 of FIGS. 17–19 is identical to that in FIGS. 1–7 except that the male member 22 is provided with threads 65 mated with threads 66 in the opening 52 of the female member. The threads 65 of the male member 22 preferably include a few deformed threads so that a predetermined minimum torque force is required to thread the male member 22 to the position of FIG. 17. The torque force may be predetermined to any value required by a particular application, and the torque force required to unthread the male member from the opening is approximately the same value to prevent accidental disassembly of the spider 20 in service. This is commonly known in the thread art as an interference threaded engagement.

The modification of FIGS. 17–19 is produced by forming the male and female members 22 and 24 respectively, then drilling and tapping the hole 52 in the female member and threading the male member at 65, then heat treating the male and female members, and then grinding as heretofore described. Finally, the male member 22 is treated into the hole 52 of the female member to form the cruciform spider 20 shown in FIG. 17. The spider may then be assembled with clevises 38 and 42 to complete the universal joint shown in FIGS. 1 and 2.

If desired, during heat treating of the male and female members 22 and 24 of this modification, the threaded portions of these members may be protected from case hardening as, for example, by copper plating these portions including the threads or by induction heat treatment of the bearing portions only. Also, if desired, when such portions are protected from case hardening, the hole 52 may be drilled and/or tapped after heat treating and the male threads 65 may be formed before or after heat treating.

Referring now to FIGS. 20–22, another modification of the novel spider 20 is shown wherein parts corresponding to those of FIGS. 1–7 are identified by corresponding numerals. In this modification, the male member 22 is slideably fitted within female member 24 and is positioned as shown in FIG. 22. A pair of punches 68, one of which is shown in FIG. 21, are then actuated to indent the female member 24 as at 70 into interlocking engagement with the male member 22 as shown in FIG. 21. Preferably, prior to the punching step the bearings 28, 30, 32 and 34 are heat treated and ground as heretofore described, so that after the punching step, the spider 20 is ready for assembly with clevises 38 and 42 to complete the universal joint of FIGS. 1 and 2. The central portions of members 22 and 24 of this modification are protected from the heat treatment as heretofore described. If desired, the punching step may precede heat treatment and grinding, in which case such protection from heat treatment is unnecessary.

It should also be noted that in this embodiment, as well as in previous embodiments, the bearings 28, 30, 32 and 34 are shown as complete cylinders, however it will be understood by one skilled in the art that, if desired, any one or all of these bearings may be formed with one or more flat areas dividing the bearing into spaced particylindrical segments struck from the same axis.

Referring again to FIG. 1, it will be understood that after the needle bearings are assembled they are interlocked with the clevises 38 and 42, as, for example, by indenting flanges 37 of the needle bearings into interlocking exgagement with the surrounding portions of the clevises.

What is claimed is:

1. In a universal joint, an elongated, steel female member having a cylindrical central portion with a transverse cylindrical hole extending therethrough, said member having smaller-diameter cylindrical end portions coaxial with said central portion, said end portions being harder than said central portion and being finished to define smooth bearings, an elongated, steel male member with a central cylindrical portion complementary to and having a tight fit in said hole to define with said female member a cruciform spider consisting solely of said members, said male member having hardened cylindrical end portions finished to define smooth bearings coaxial with the central portion of the male member, the axis of the female member bearings being substantially normal to the axis of the male bearings, said central portion of the female member being more ductile than its end portions to avoid cracking said central portion of the female member as the central portion of the male member is tightly fitted into said hole.

2. A universal joint according to claim 1 wherein the central portion of the male member is brazed in the hole.

3. A universal joint according to claim 1 wherein the fit of the central portion of the male member in said hole is along inteference threads of the respective members.

4. In a method of making a universal joint, the steps of forming an elongated, steel female member with a larger-diameter cylindrical central portion and with spaced smaller-diameter cylindrical coaxial end portions coaxial with the central portion, hardening said end portions only, to form them into hard brittle bearings interconnected by the central portion which is more ductile, drilling a transverse cylindrical hole through the central portion with the axis of said hole substantially normal to the axis of said female member portions, forming an elongated, steel male member with coaxial cylindrical end portions and a central cylindrical portion coaxial therewith and complementary to said hole, hardening said male member end portions to form them into hard, brittle bearings, tightly fitting the male member central portion into said hole as the sole connection between said members without deforming either of them and without connecting either of them to any other structure, and then pivotally connecting bearings of a pair of clevises to the bearing of respective members without connecting the members to any other structure.

5. A method according to claim 4 wherein the central portion of the male member is brazed to the female member in said hole.

6. A method according to claim 4 wherein the fitting of the male member central portion is done by threading the members together along interference threads of respective members in said hole.

* * * * *